United States Patent
Minamikawa et al.

(10) Patent No.: US 8,327,626 B2
(45) Date of Patent: Dec. 11, 2012

(54) EXHAUST EMISSION CONTROL DEVICE

(75) Inventors: Jinichi Minamikawa, Hino (JP); Hironori Narita, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 575 days.

(21) Appl. No.: 12/595,243

(22) PCT Filed: Mar. 13, 2008

(86) PCT No.: PCT/JP2008/000560
§ 371 (c)(1),
(2), (4) Date: Oct. 9, 2009

(87) PCT Pub. No.: WO2008/129781
PCT Pub. Date: Oct. 30, 2008

(65) Prior Publication Data
US 2010/0043403 A1 Feb. 25, 2010

(30) Foreign Application Priority Data
Apr. 17, 2007 (JP) .................. 2007-108420

(51) Int. Cl.
*F01N 3/00* (2006.01)
*F01N 3/10* (2006.01)
*F01N 3/02* (2006.01)

(52) U.S. Cl. ............. 60/295; 60/285; 60/286; 60/297; 60/299; 60/303; 60/311

(58) Field of Classification Search ............ 60/285, 60/286, 295, 297, 299, 303, 311
See application file for complete search history.

(56) References Cited

U.S. PATENT DOCUMENTS

| 2006/0000201 | A1 | 1/2006 | Iizuka et al. |
| 2007/0214778 | A1* | 9/2007 | Narita et al. ............... 60/299 |
| 2008/0307773 | A1* | 12/2008 | Kogo ......................... 60/286 |

FOREIGN PATENT DOCUMENTS

| JP | 3 108812 | 11/1991 |
| JP | 2003 155915 | 5/2003 |
| JP | 2003 222040 | 8/2003 |
| JP | 2005 171974 | 6/2005 |
| JP | 2005155529 A * | 6/2005 |
| JP | 2005 282479 | 10/2005 |
| JP | 2005 299418 | 10/2005 |
| JP | 2006 37925 | 2/2006 |
| WO | WO 2006075801 A1 * | 7/2006 |

OTHER PUBLICATIONS

Narita et al., Machine Translation of JP 2005-155529 A, Jun. 16, 2005.*
Narita et al., English Abstract of JP 2005-155529 A, Jun. 16, 2005.*

* cited by examiner

*Primary Examiner* — Thomas Denion
*Assistant Examiner* — Audrey K Bradley
(74) *Attorney, Agent, or Firm* — Oblon, Spivak, McClelland, Maier & Neustadt, L.L.P.

(57) ABSTRACT

A controller is constructed such that fuel addition by a fuel injection device is automatically conducted when a predetermined time has passed with a diesel engine being in an idling state, and without a regeneration button being manually operated under a condition of a particulate deposition amount being estimated by the controller on the basis of a pressure signal from a pressure sensor to be within a manual regeneration range over said automatic regeneration range.

25 Claims, 2 Drawing Sheets

EXHAUST EMISSION CONTROL DEVICE

TECHNICAL FIELD

The present invention relates to an exhaust emission control device.

BACKGROUND ART

Particulates or particulate matter in exhaust gas from a diesel engine is mainly constituted by carbonic soot and a soluble organic fraction (SOF) of high-boiling hydrocarbons and contains a trace of sulfate (misty sulfuric acid fraction). In order to reduce a discharged amount of particulates from the engine, a particulate filter is conventionally incorporated in an exhaust pipe through which the exhaust gas flows.

This kind of particulate filter is constituted by a porous honeycomb structure made of ceramics such as cordierite and having lattice-like compartmentalized passages; alternate ones of the passages have plugged inlets and the remaining passages with unplugged open inlets are plugged at their outlets. Thus, only the exhaust gas passing through thin porous walls compartmentalizing the respective passages is discharged downstream.

The particulates in the exhaust gas, which are captured and accumulated on inner surfaces of the thin porous walls, require to be burned off so as to regenerate the particulate filter before exhaust resistance considerably increases due to clogging. However, the exhaust gas from the diesel engine in a normal engine operation status rarely has a chance to obtain a temperature level at which the particulates ignite by themselves. Thus, used is a catalytic regenerative particulate filter integrally carrying an oxidation catalyst.

Use of such catalytic regenerative particulate filter will accelerate oxidation reaction of the captured particulates to lower their ignition temperature, so that the particulates can be burned off at exhaust temperature level lower than ever before.

However, even if such catalyst regenerative particulate filter is used, a captured amount may exceed a treated amount of particulates in engine operation areas with low exhaust temperature levels. Continued engine operation with such low exhaust temperature levels may hinder sufficient regeneration of the particulate filter, resulting in excessive accumulation of the captured particulates in the filter.

To this end, it has been conceived to additionally arrange a flow-through type oxidation catalyst in front of the particulate filter; with accumulation of the particulates becoming increased, fuel is added to the exhaust gas upstream of the oxidation catalyst to forcibly regenerate the particulate filter.

More specifically, fuel (HC) added upstream of the particulate filter undergoes oxidation reaction during its passage through the frontward oxidation catalyst. The exhaust gas heated by heat of the reaction and flowing into the particulate filter just behind increases a catalytic floor temperature of the filter to burn off the particulates, thereby regenerating the particulate filter.

This kind of fuel addition may be specifically realized such that fuel main injection at or near a compression upper dead center is followed by post injection at non-ignition timing after the compression upper dead center to add fuel into the exhaust gas.

Prior art references for such forced regeneration of particulate filter are, for example, the following Patent Literatures 1 and 2 by the same applicant as that of the present invention.

[Patent Literature 1] JP 2003-155915A
[Patent Literature 2] JP 2003-222040A

SUMMARY OF INVENTION

Technical Problems

Conventionally prevailing design concept is to determine over-capturing of the particulate filter, for example, by detecting pressure difference between inlet- and outlet-side of the particulate filter using pressure sensors arranged in front of and behind the filter or to determine over-capturing of the particulate filter, for example, in terms of travel distance and/or travel hours, and to conduct forced regeneration of the particulate filter through automatic control during traveling of a vehicle. However, in vehicles with travel form hardly matched with travel conditions suited for conducting forced regeneration (such as buses traveling on midtown trafficky streets or trucks for delivery services in grove of customers for delivery), automatically controlled forced regeneration of the particulate filter during traveling may not always end in completion of the regeneration. Therefore, it has been proposed for such vehicles with travel form hardly matched with travel conditions suited for forced regeneration to enable voluntary regeneration of particulate filter by a driver's manual operation in idling state with a vehicle being halted.

In this kind of forced regeneration of the particulate filter, in terms of a particulate deposition amount, there exist a range where particulates may undergo oxidation process over whole operation areas of a diesel engine and a range where particulates may undergo oxidation process only for stable operation areas of the engine. In the present description, the former is referred to as automatic regeneration range representing a region of deposition amount which can be dealt with by automatically controlled forced regeneration; and the latter, as manual regeneration range where forced regeneration is to be conducted with the driver's own will and by his or her manual operation while the vehicle is kept idle. In the above-mentioned vehicles with travel form hardly matched with travel conditions suited for forced regeneration, repeated interruption of forced regeneration may have tendency of the particle deposition amount being increased beyond the automatic regeneration range into the manual regeneration range; also in this view, it has been desired to enable manual conducting of forced regeneration of a particulate filter.

However, even if a vehicle is actually provided with an exhaust emission control device which can conduct forced regeneration of a particulate filter both through automatic control and through a manual operation, a driver may forget to conduct a manual operation, resulting in incomplete automatic forced regenerations repeated for a long term. Then, the particulate deposition amount may reach a regeneration prohibition range where forced regeneration is prohibited, resulting in required maintenance of the vehicle for example in a dealer for detachment and cleaning of the particulate filter.

The above-mentioned regeneration prohibition range of particulate deposition amount is a range of deposition amount level (a range beyond the manual regeneration range) where conducting the forced regeneration may accompany high-temperature combustion adversely affecting durability of the particulate filter due to combustion of a great amount of particulates all at once.

The invention was made in view of the above and has its object to provide an exhaust emission control device which can automatically conduct forced regeneration even if a driver forgets to conduct a manual operation when travel conditions are met for the manual operation of the forced regeneration of the particulate filter

Solution to Problems

The invention is directed to an exhaust emission control device comprising a catalyst regeneration type particulate filter incorporated in an exhaust pipe and having a frontward oxidation catalyst, and fuel addition means for addition of fuel into the exhaust gas upstream of said oxidation catalyst, captured particles being burned by heat of oxidation reaction which the fuel added by the fuel addition means undergoes on the oxidation catalyst to thereby attain forced regeneration of the particulate filter, characterized in that it comprises deposition amount estimating means for estimation of a particle deposition amount in the particulate filter, a controller for automatically conducting fuel addition by the fuel addition means depending upon the deposition amount under condition of the particulate deposition amount being estimated by said deposition amount estimating means to be within an automatic regeneration range and operation means for voluntary fuel addition by a driver's manual operation under condition of the engine being in idling state, said controller being constituted such that fuel addition is automatically conducted by said fuel addition means when a predetermined time has passed during the engine being in idling state and with no manual operation of said operation means under condition of the particulate deposition amount being estimated by the deposition amount estimating means to be within a manual regeneration range over said automatic regeneration range.

Thus, even if the driver forgets to conduct the manual operation, the fuel addition by the fuel addition means is automatically conducted by the controller when the predetermined time has passed during the engine being in idling state under the condition of the particulate deposition amount being estimated to be within the manual regeneration range over the automatic regeneration range, the added fuel undergoing oxidation reaction on the oxidation catalyst in front of the particulate filter, inflow of the exhaust gas elevated in temperature by the heat of the reaction bringing about elevation in temperature of the particulate filter just behind so that the particulates are burned off to attain regeneration of the particulate filter.

When forced regeneration of the particulate filter is to be conducted by the driver's will, he or she halts the vehicle in idling state to operate the operation means, so that fuel addition by the fuel addition means is voluntarily conducted by the controller, the added fuel undergoing oxidization reaction on oxidation catalyst in front of the particulate filter, inflow of the exhaust gas elevated in temperature by the heat of the reaction bringing about elevation in temperature of the catalytic floor of the particulate filter just behind to thereby burn off the particulates and attain regeneration of the particulate filter.

Further, under condition of the particulate deposition amount being estimated to be within the automatic regeneration range, the fuel addition by the fuel addition means is automatically conducted by the controller during traveling depending upon the deposition amount, the added fuel undergoing oxidation reaction on the oxidation catalyst in front of the particulate filter, inflow of the exhaust gas elevated in temperature by the heat of the reaction bringing about elevation in temperature of the catalytic floor of the particulate filter just behind to thereby burn off the particulates and attain the regeneration of the particulate filter.

In order to specifically conduct the invention, preferably a fuel injection device in an engine may be applied as fuel addition means, the fuel injection into the cylinders being controlled by the controller to leave much unburned fuel in the exhaust gas, thereby attaining fuel addition.

In the invention, in order to increase a rotational frequency of the engine upon forced regeneration of the particulate filter in idling state in comparison with that in ordinary idling, it is preferable to control the fuel injection into the cylinders by the controller to increase the injection amount per main injection. Then, the rotational frequency of the engine higher than that in ordinary idling elevates the temperature and flow rate of the exhaust gas up to levels suited for forced regeneration.

In the invention, idling determination means may comprise a rotation sensor for detection of rotational frequency of the engine in combination with one of more of a load sensor for detecting load of the engine, a neutral switch for detection to know whether a gear is shifted in neutral position or not, a side brake switch for detection to know whether a side brake is on or not, and a vehicle speed sensor for detecting a speed of the vehicle.

In the invention, exhaust throttle means may be provided so as to properly throttle a flow rate of the exhaust from the engine, the exhaust throttle means being chokingly operated upon the forced regeneration of the particulate filter during idling state; the exhaust throttle means may comprise, for example, an exhaust brake incorporated in the exhaust pipe.

Thus, upon the forced regeneration of the particulate filter during idling state, exhaust flow rate is throttled by the exhaust throttle means, which increases pressure of the upstream exhaust gas to thereby increase the exhaust temperature. Moreover, increased resistance of engine exhaust makes it difficult for relatively low-temperatured suction air to enter into the cylinders, which increase residual quantity of relatively high-temperatured exhaust gas; the air in the cylinders including such relatively high-temperatured exhaust gas in large quantity is compressed in a next compression stroke followed by an explosion stroke, thereby further increasing the exhaust temperature.

Advantageous Effects of Invention

According to the above-mentioned exhaust emission control device of the invention, the following excellent effects and advantages can be obtained.
(I) Even if the driver forgets to conduct the manual operation, the forced regeneration is automatically conducted by backup of the controller to attain regeneration of the particulate filter when a predetermined time period has passed during an engine being in idling state under the condition of the particulate deposition amount being estimated to be within the manual regeneration range over the automatic regeneration range. Therefore, lack of the manual operation due to the driver's forgetting does not result in reaching of the particulate deposition amount into a regeneration prohibition range where no forced regeneration can be conducted. Thus, preliminarily prevented is a situation which requires cleaning of the particulate filter in a detached manner in, for example, a dealer.
(II) When the exhaust throttle means is provided to throttle the flow rate of the exhaust from the engine and the exhaust throttle means is chokingly operated upon the forced regeneration of the particulate filter during the idling state, throttling of the exhaust flow rate by the exhaust throttle means can further increase the exhaust temperature, which can facilitate the forced regeneration of the particulate filter during the idling state with the vehicle being halted.

REFERENCE SIGNS LIST 1 diesel engine (engine)
3 exhaust gas
4 exhaust pipe
5 oxidation catalyst
6 particulate filter
8 pressure sensor (deposition amount estimating means)
9 controller (controller: deposition amount estimating means)
10 fuel injection device (fuel addition means)
11 accelerator sensor (load sensor: idling determination means)
12 rotation sensor (idling determination means)
15 regeneration button (operation means)
17 neutral switch (idling determination means)
18 side brake switch (idling determination means)
19 vehicle speed sensor (idling determination means)
20 exhaust brake (exhaust throttle means)

DESCRIPTION OF EMBODIMENTS

An embodiment of the invention will be described in conjunction with drawings.

Figure 1:
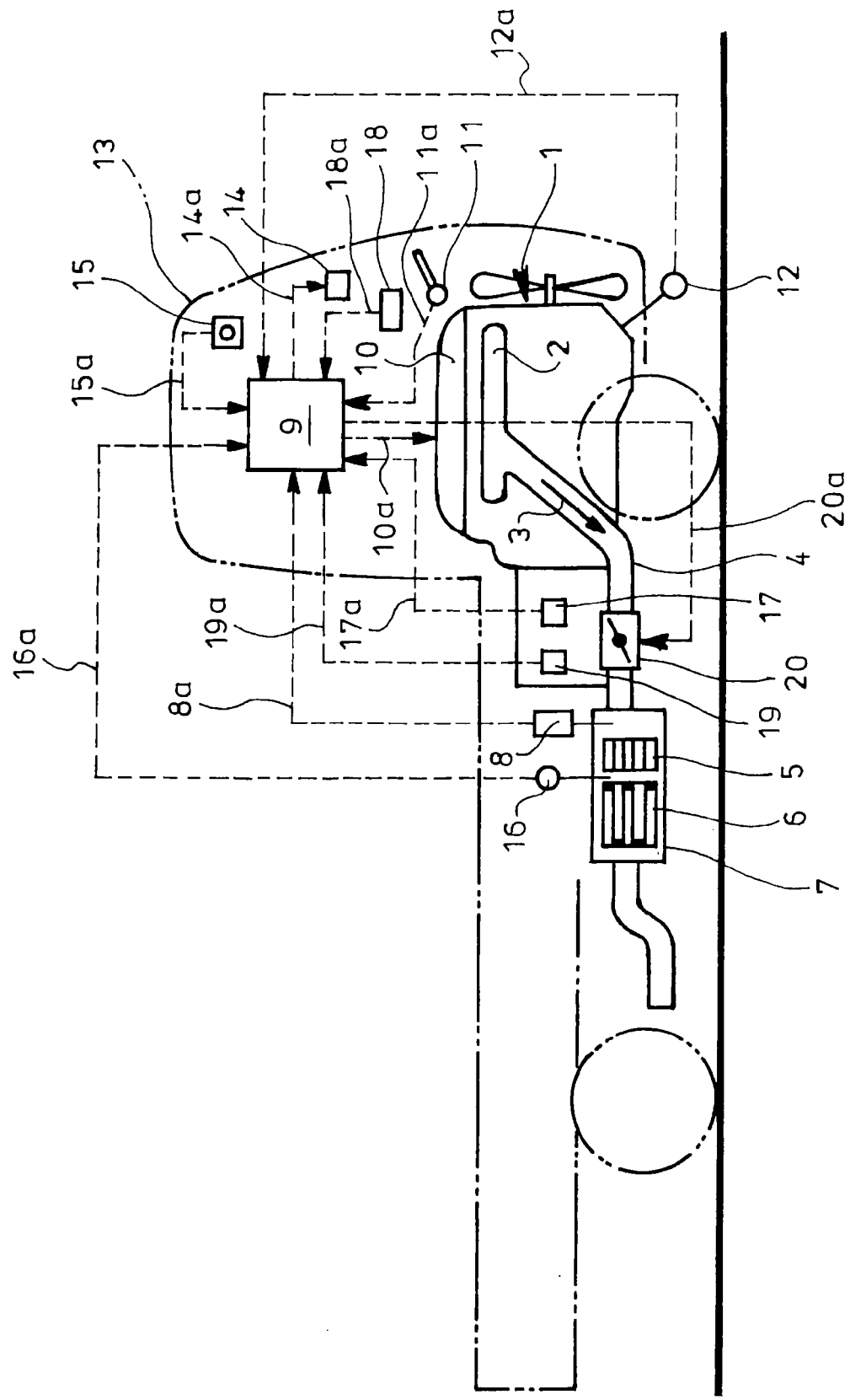
FIG. 1 is a schematic view showing an embodiment of the invention.
Figure 2:
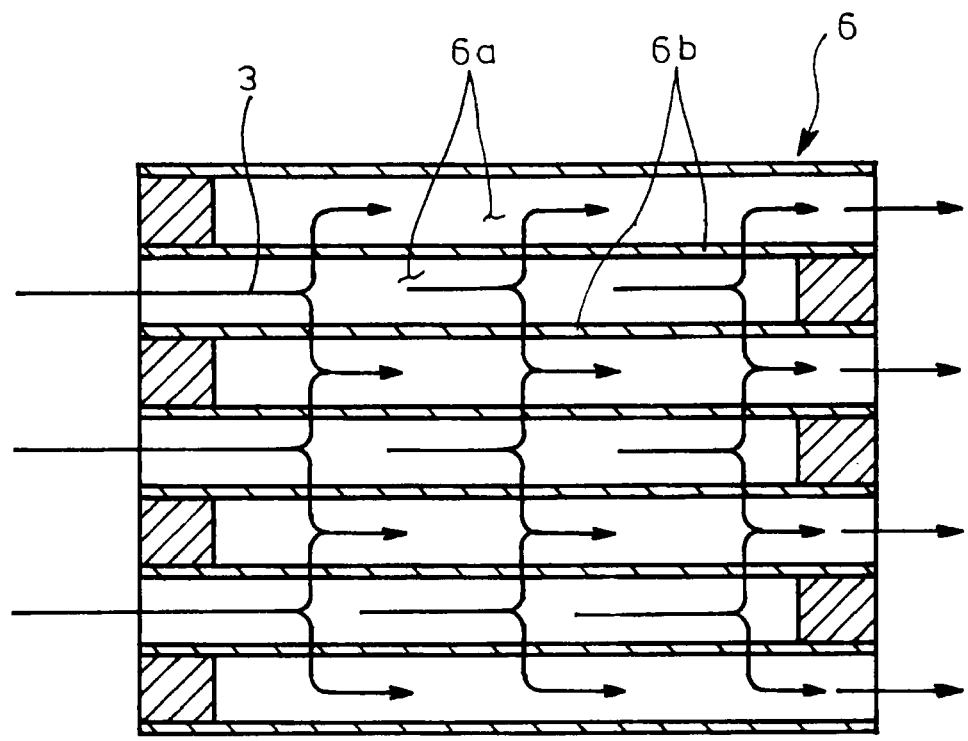
FIG. 2 is a sectional view showing particulars of the particulate filter shown in FIG. 1.
Figure 3:
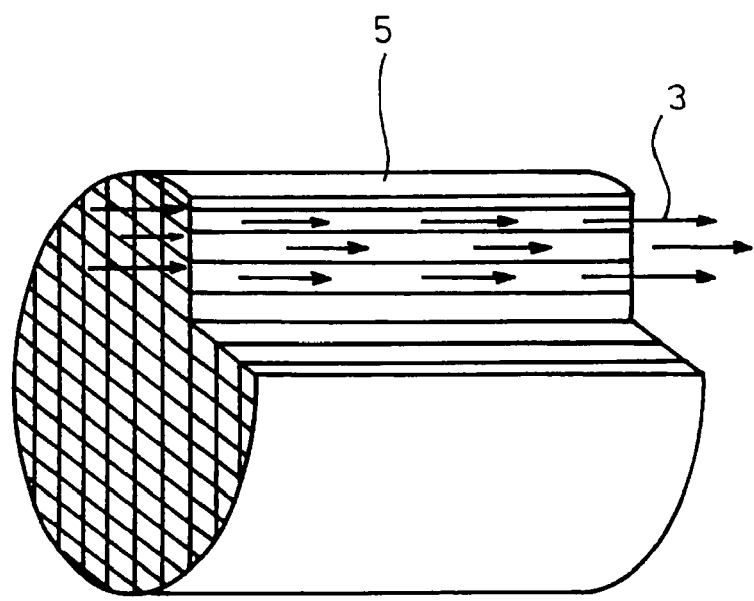
FIG. 3 is a partly cutout perspective view of the oxidation catalyst shown in FIG. 1.

FIGS. 1-3 show the embodiment of the invention. In the exhaust emission control device of the embodiment, as shown in FIG. 1, exhaust gas 3 discharged via an exhaust manifold 2 from a diesel engine 1 (engine) in a vehicle flows through an exhaust pipe 4 in which incorporated is a catalyst regeneration type particulate filter 6 with a frontward oxidation catalyst 5 and encased by a filter casing 7.

Specifically, accommodated in the filter casing 7 is the particulate filter 6 as shown in enlarged scale in FIG. 2. The particulate filter 6 is a porous honeycomb structure made of ceramics and having lattice-like compartmentalized passages 6a; alternate ones of the passages 6a have plugged inlets and the remaining passages 6a with unplugged open inlets are plugged at their outlets. Thus, only the exhaust gas 3 passing through the thin porous compartment walls 6b is discharged downstream. Arranged in front of and associated with the particulate filter 6 is a flow-through type oxidation catalyst 5 as shown in partly cutout form in FIG. 3.

Then, a pressure sensor 8 is arranged at an inlet side of the filter casing 7, a pressure signal 8a from the pressure sensor 8 being inputted to a controller 9 which is an engine controlling computer (ECU: Electronic Control Unit). In the controller 9, on the basis of the pressure signal 8a from the sensor 8, any pressure difference between inlet and outlet sides of the particulate filter 6 (pressure loss on the outlet side being preset) is calculated; estimated on the basis of the pressure difference is particulate deposition amount in the particulate filter 6.

Specifically, in the embodiment illustrated, the deposition amount estimating means which estimates the particulate deposition amount in the particulate filter 6 comprises a pressure sensor 8 and a controller 9. There may be various modes for estimation of such particulate deposition amount. For example, a fundamental generated amount of the particles may be estimated based on the current operation conditions of the diesel engine 1, the estimated fundamental generated amount being multiplied by modification coefficient determined in consideration of various conditions relating to generation of particulates, and a treated amount of the particulates in the current operation conditions being subtracted from this to obtain a final generated amount, such final generated amounts being momentarily cumulated to estimate a particulate accumulated amount.

The controller 9 illustrated, which serves also as an engine control computer, serves also to control fuel injection. More specifically, on the basis of an accelerator stepped-in degree signal 11a from an accelerator sensor 11 (load sensor) which detects accelerator stepped-in degree as load of the diesel engine 1 and a rotational frequency signal 12a from the rotation sensor 12 for detection of engine rotational frequency of the diesel engine 1, a fuel injection signal 10a is outputted to a fuel injection device 10 which injects fuel into respective cylinders in the diesel engine 1.

The fuel injection device 10 is constituted by a plurality of injectors each for each of the cylinders. In each of the injectors, an electromagnetic valve is controlled to be selectively opened and closed by the fuel injection signal 10a so that fuel injection timing (valve opening timing) and fuel injection amount (valve opening time period) are properly controlled.

On the other hand, in the controller 9, fuel injection signal 10a in normal mode is determined on the basis of the accelerator stepped-in degree signal 11a and the rotational frequency signal 12a. When the forced regeneration of the particulate filter 6 is to be conducted, normal mode is switched into regeneration mode and the fuel injection signal 10a is determined with an injection pattern such that the main injection of the fuel near the compression upper dead center (crank angle 0°) is followed by post injection at non-ignition timing after the compression upper dead center.

Specifically, in the embodiment, the fuel injection device 10 serves as fuel addition means for forced regeneration of the particulate filter 6. As mentioned in the above, the main injection is followed by the post injection at the non-ignition timing after the compression upper dead center; by the post injection, unburned fuel (mainly hydrocarbon: HC) is added into the exhaust gas 3. Such unburned fuel undergoes oxidation reaction on the oxidation catalyst 5 in front of the particulate filter 6, the catalytic floor temperature being elevated by heat of the reaction to burn off the particulates in the particulate filter 6.

Further, mounted on an instrument panel in a cab 13 are a warning lamp 14 which receives a warning signal 14a from the controller 9 and is lighted when the controller 9 determines that the deposition amount in the particulate filter 6 reaches the manual regeneration range, and a regeneration button 15 serving as operation means for voluntarily conducting fuel addition by the fuel injection device 10 under condition of the diesel engine 1 being in idling state.

Then, in the controller 9, whether the particulate deposition amount estimated on the basis of the pressure signal 8a from the pressure sensor 8 is over an acceptable level or not is determined. When it is determined that the estimated particulate deposition amount is over the acceptable level and the it is confirmed that the particulate deposition amount is within the automatic regeneration range, excess of the inlet exhaust temperature of the particulate filter 6 over a predetermined temperature is waited for on the basis of the temperature signal 16a from the temperature sensor 16. When the temperature condition is satisfied, then the combustion injection control is switched from the normal mode to the regeneration mode and the forced regeneration of the particulates is started by automatic control.

Even if it is determined that the particulate deposition amount is beyond the acceptable level, the combustion injection control is maintained in normal mode without switching to the regeneration mode when it is determined that the deposition amount already reaches the manual regeneration range over the automatic regeneration range, and the warning signal 14a is outputted from the controller 9 to light the warning lamp 14 on the instrument panel, letting the driver know the necessity of forced regeneration of the particulate filter 6 by manual operation.

Then, under the condition of the diesel engine 1 being in idling state the regeneration button 15 is operated by the driver to input the regeneration command signal 15a into the controller 9; and excess of the inlet exhaust temperature of the particulate filter 6 over the predetermined temperature is waited for on the basis of the temperature signal 16a from the temperature sensor 16. When the temperature condition is satisfied, the combustion injection control is switched from the normal mode to the regeneration mode. In such forced regeneration of the particulate filter 6 by manual operation, in order to increase the rotational frequency in comparison with that in normal idling status, the fuel injection signal 10a is outputted with an injection pattern such that injection amount per main injection conducted near the compression upper dead center (crank angle 0°) is increased and the main injection is followed by the post injection at non-ignition timing after the compression upper dead center.

Specifically, in idling state with the vehicle being halted, when forced regeneration of the particulate filter 6 is to be conducted, temperature and flow rate of the exhaust gas 3 are too low to conduct satisfactory burning-off of the particulates. Therefore, injection amount per main injection is increased in comparison with that in normal idling to increase rotational frequency and thus charged energy amount to thereby elevate the temperature and flow rate of the exhaust gas 3 up to levels suited for the forced regeneration.

Then, with respect to the above-mentioned exhaust emission control device where the manual operation using the regeneration button 15 may be conducted voluntarily, in the embodiment, the combustion injection control is automatically switched from the normal mode to the regeneration mode and the forced regeneration is started as if the regeneration button 15 were manually operated when the predetermined time has passed with no manual operation of the button 15 during the diesel engine 1 being in idling state under the condition of the particulate accumulation amount being estimated to be within the manual regeneration range over the automatic regeneration range.

In the controller 9 in the embodiment, in addition to the above-illustrated accelerator sensor 11 and the rotation sensor 12, detection signals 17a and 18a and a vehicle speed signal 19a are inputted from a neutral switch 17 for detection to know whether a gear is shifted in neutral position or not and a side brake switch 18 for detecting whether a side brake is on or not and a vehicle speed sensor 19 for detection of vehicle speed, respectively. On the basis of those signals, it is determined in the controller 9 whether the vehicle is in idling state or not.

Specifically, in the controller 9, it is determined that the vehicle is now in idling state when it is confirmed by the rotation sensor 12 that the engine is in a relatively low, predetermined rotational frequency area, when it is confirmed by the accelerator sensor 11 that the accelerator is off (load is zero), when it is confirmed by the neutral switch 17 that the gear is shifted in neutral position, when it is confirmed by the side brake switch 18 that the side brake is on and when it is confirmed by the vehicle speed sensor 19 that vehicle speed is zero.

However, for determination of idling state, all of such signals from the sensors and switches are not necessarily required; the idling determination means may be constituted by at least the rotation sensor 12 in combination with any of the accelerator sensor 11, neutral switch 17, side brake switch 18 and vehicle speed sensor 19.

Arranged in an appropriate position upstream of the particulate filter 6 is an exhaust brake 20 with controllable opening degree which can throttle the flow passage of the exhaust pipe 4 into an appropriate opening degree. The exhaust brake 20 is controlled in opening degree by an opening degree command signal 20a from the controller 9; in the embodiment, when regeneration mode is selected by the controller 9, an operation different from the inherent operation is commanded by the controller 9 to the exhaust brake 20 so that the exhaust brake 20 can be utilized as exhaust throttle means as detailed hereinafter for elevation of the exhaust temperature.

Thus, with the exhaust emission control device constructed as mentioned in the above, when, irrespective of the fact that the warning lamp 14 is lighted to let the driver know the necessity of forced regeneration of the particulate filter 6 by manual operation, a predetermined time has passed during the vehicle being halted in idling state without change because of the driver's forgetting of conducting the manual operation due to, for example, the driver's devotion in delivery services, the combustion injection control is automatically switched by the controller 9 from the normal mode to the regeneration mode and the forced regeneration is started as if the regeneration button 15 were manually operated.

Specifically, injection amount per main injection is increased in fuel injection control to increase the rotational frequency of the diesel engine 1 in comparison with that in the normal idling status, and the main injection is followed by post injection at non-ignition timing after the compression upper dead center, so that temperature and flow rate of the exhaust gas 3 are elevated to levels suited for the forced regeneration and unburned fuel is added into the exhaust gas 3, which brings about oxidation reaction of the fuel on the oxidation catalyst in front of the particulate filter 6, the catalytic floor temperature being elevated by heat from the reaction to burn off the particulates in the particulate filter 6, thereby attaining regeneration of the particulate filter 6.

Especially in the embodiment, when the controller 9 is switched from the normal mode to the regeneration mode, the exhaust brake 20 which receives choking operation command from the controller 9 as opening degree command signal 20a throttles the exhaust flow rate so that the upstream exhaust gas 3 is elevated in pressure to attain elevation of the exhaust temperature.

Specifically, temperature T, exhaust pressure P and flow rate V of the exhaust gas 3 has the following relational equation $$P \cdot V/T = \text{constant}$$

and therefore, if exhaust flow passage is throttled to increase the exhaust pressure P while the flow rate V is kept constant, temperature T of the exhaust gas 3 is greatly elevated with respect to a predetermined traveling state.

Moreover, increased exhaust resistance from the diesel engine 1 makes it difficult for relatively low-temperatured suction air to enter into the cylinders so that residual amount of the relatively high-temperatured exhaust gas 3 increases, the air in the cylinders including great amount of such relatively high-temperatured exhaust gas 3 being compressed in the next compression stroke followed by the explosion stroke, thereby attaining further elevation of the exhaust temperature.

When the warning lamp 14 is lighted to let the driver know the necessity of forced regeneration of the particulate filter 6 by manual operation and if the driver who confirms the fact on the driver's seat to halt the vehicle in idling state and push the regeneration button 15 on the instrument panel, the forced regeneration just like the above is voluntarily started by the driver's will.

If the particulate deposition amount is beyond the acceptable level and the deposition amount is determined by the controller 9 to be within the automatic regeneration range, then on the basis of the temperature signal 16a from the temperature sensor 16, excess of the inlet exhaust temperature of the particulate filter 6 over a predetermined temperature is waited for. When the condition satisfied, the combustion injection control is switched from the normal mode to the regeneration mode and forced regeneration of the particulate filter 6 is started during traveling by automatic control.

Thus, according to the above embodiment, even if the driver forgets to conduct the manual operation, when a predetermined time has passed with idling status under the condition of the particulate deposition amount being estimated to be within the manual regeneration range over the automatic regeneration range, the forced regeneration is automatically conduced for the particulate filter 6 by backup of the controller 9. As a result, the defect that, due to the driver's forgetting and with no manual operation being conducted, the particulate deposition amount reaches the regeneration prohibition range where forced regeneration cannot be conducted can be prevented and a situation which requires cleaning of the particulate filter in a detached manner in, for example, a dealer can be preliminarily prevented.

Specifically in the embodiment, upon forced regeneration of the particulate filter 6 during idling state, throttling of the exhaust flow rate by the exhaust brake 20 can bring about further elevation of the exhaust temperature, which can facilitate the forced regeneration of the particulate filter during idling state with the vehicle being halted.

It is to be understood that an exhaust emission control device of the invention is not limited to the above-mentioned embodiment and that various changes and modifications may be made without departing from the scope of the invention. For example, in the above embodiment, fuel is added into the exhaust gas such that the fuel injection device is applied as fuel addition means, the main injection of the fuel near the compression upper dead center being followed by post injection at non-ignition timing after the compression upper dead center; alternatively, fuel may be added into the exhaust gas by delaying the timing of the main injection into the cylinders than usual. Further, not only the above-mentioned fuel addition means where fuel injection into the cylinders is controlled to leave much unburned fuel in the exhaust gas to thereby conduct fuel addition, but also an injector may arranged in appropriate position in the exhaust pipe (or, may be, in the exhaust manifold) as fuel addition means so that fuel may be directly added into the exhaust gas by such injector. In order to further elevate the temperature of the exhaust gas, the main injection may be directly followed by the post injection at combustible timing. As exhaust throttle means for properly throttling the exhaust flow rate, the exhaust brake is not always a requisite; alternatively, a separate exhaust throttle valve may be incorporated in the exhaust pipe. In order to deteriorate in-cylinder combustion to elevate the exhaust temperature, suction throttle means may be used which properly throttles the flow rate of sucked air. In order to determine the idling state, any further signal or signals such as clutch signal may be considered for more accurate determination. The operation means for voluntarily operating the fuel addition means may be a switch other than the regeneration button.

The invention claimed is:

1. An exhaust emission control device for an exhaust system including a catalyst regeneration type particulate filter incorporated in an exhaust pipe and having a frontward oxidation catalyst, and a fuel addition device to add fuel into the exhaust gas upstream of said oxidation catalyst, captured particles being burned by heat of oxidation reaction which the fuel added by the fuel addition device undergoes on the oxidation catalyst to thereby attain forced regeneration of the particulate filter, said exhaust emission control device comprising:
a controller including a deposition amount estimating unit that estimates a particle deposition amount in the particulate filter, said controller automatically conducts fuel addition by the fuel addition device depending upon the deposition amount under a condition of the particulate deposition amount being estimated by said deposition amount estimating unit to be within an automatic regeneration range and an operation device voluntarily adds fuel by a driver's manual operation under a condition of an engine being in an idling state, and said controller controls fuel addition to be automatically conducted by said fuel addition device when a predetermined time has passed during the engine being in the idling state and with no manual operation of said operation device under a condition of the particulate deposition amount being estimated by the deposition amount estimating unit to be within a manual regeneration range over said automatic regeneration range.

2. An exhaust emission control device as claimed in claim 1, wherein an exhaust throttle device is provided so as to properly throttle a flow rate of the exhaust from the engine, said exhaust throttle device being chokingly operated upon the forced regeneration of the particulate filter during the idling state.

3. An exhaust emission control device as claimed in claim 2, wherein the exhaust throttle device includes an exhaust brake.

4. An exhaust emission control device as claimed in claim 1, wherein the exhaust system includes an idling determination device which is a combination of a rotation sensor that detects a rotational frequency of the engine with any one or more of a load sensor that detects a load of the engine, a neutral switch that detects to know whether a gear is shifted in neutral position or not, a side brake switch that detects to know whether a side brake is on or not, and a vehicle speed sensor that detects a speed of the vehicle.

5. An exhaust emission control device as claimed in claim 4, wherein an exhaust throttle device is provided so as to properly throttle a flow rate of the exhaust from the engine, said exhaust throttle device being chokingly operated upon the forced regeneration of the particulate filter during the idling state.

6. An exhaust emission control device as claimed in claim 5, wherein the exhaust throttle device includes an exhaust brake.

7. An exhaust emission control device as claimed in claim 1, wherein, in order to increase a rotational frequency of the engine upon forced regeneration of the particulate filter in the idling state in comparison with that in ordinary idling, fuel injection into cylinders is controlled by the controller to increase an injection amount per main injection.

8. An exhaust emission control device as claimed in claim 7, wherein an exhaust throttle device is provided so as to properly throttle a flow rate of the exhaust from the engine, said exhaust throttle device being chokingly operated upon the forced regeneration of the particulate filter during the idling state.

9. An exhaust emission control device as claimed in claim 8, wherein the exhaust throttle device includes an exhaust brake.

10. An exhaust emission control device as claimed in claim 7, wherein the exhaust system includes an idling determination device which is a combination of a rotation sensor that detects a rotational frequency of the engine with any one or more of a load sensor that detects a load of the engine, a neutral switch that detects to know whether a gear is shifted in neutral position or not, a side brake switch that detects to know whether a side brake is on or not, and a vehicle speed sensor that detects a speed of the vehicle.

11. An exhaust emission control device as claimed in claim 10, wherein an exhaust throttle device is provided so as to properly throttle a flow rate of the exhaust from the engine, said exhaust throttle device being chokingly operated upon the forced regeneration of the particulate filter during the idling state.

12. An exhaust emission control device as claimed in claim 11, wherein the exhaust throttle device includes an exhaust brake.

13. An exhaust emission control device as claimed in claim 1, wherein a fuel injection device in the engine is employed as the fuel addition device, fuel injection into cylinders being controlled by the controller such that unburned fuel is left in the exhaust gas for fuel addition.

14. An exhaust emission control device as claimed in claim 13, wherein an exhaust throttle device is provided so as to properly throttle a flow rate of the exhaust from the engine, said exhaust throttle device being chokingly operated upon the forced regeneration of the particulate filter during the idling state.

15. An exhaust emission control device as claimed in claim 14, wherein the exhaust throttle device includes an exhaust brake.

16. An exhaust emission control device as claimed in claim 13, wherein the exhaust system includes an idling determination device which is a combination of a rotation sensor that detects a rotational frequency of the engine with any one or more of a load sensor that detects a load of the engine, a neutral switch that detects to know whether a gear is shifted in neutral position or not, a side brake switch that detects to know whether a side brake is on or not, and a vehicle speed sensor that detects a speed of the vehicle.

17. An exhaust emission control device as claimed in claim 16, wherein an exhaust throttle device is provided so as to properly throttle a flow rate of the exhaust from the engine, said exhaust throttle device being chokingly operated upon the forced regeneration of the particulate filter during the idling state.

18. An exhaust emission control device as claimed in claim 17, wherein the exhaust throttle device includes an exhaust brake.

19. An exhaust emission control device as claimed in claim 13, wherein, in order to increase a rotational frequency of the engine upon forced regeneration of the particulate filter in the idling state in comparison with that in ordinary idling, the fuel injection into the cylinders is controlled by the controller to increase an injection amount per main injection.

20. An exhaust emission control device as claimed in claim 19, wherein an exhaust throttle device is provided so as to properly throttle a flow rate of the exhaust from the engine, said exhaust throttle device being chokingly operated upon the forced regeneration of the particulate filter during the idling state.

21. An exhaust emission control device as claimed in claim 20, wherein the exhaust throttle device includes an exhaust brake.

22. An exhaust emission control device as claimed in claim 19, wherein the exhaust system includes an idling determination device which is a combination of a rotation sensor that detects a rotational frequency of the engine with any one or more of a load sensor that detects a load of the engine, a neutral switch that detects to know whether a gear is shifted in neutral position or not, a side brake switch that detects to know whether a side brake is on or not, and a vehicle speed sensor that detects a speed of the vehicle.

23. An exhaust emission control device as claimed in claim 22, wherein an exhaust throttle device is provided so as to properly throttle a flow rate of the exhaust from the engine, said exhaust throttle device being chokingly operated upon the forced regeneration of the particulate filter during the idling state.

24. An exhaust emission control device as claimed in claim 23, wherein the exhaust throttle device includes an exhaust brake.

25. An exhaust system comprising:
a catalyst regeneration type particulate filter incorporated in an exhaust pipe and having a frontward oxidation catalyst,
a fuel addition device to add fuel into the exhaust gas upstream of said oxidation catalyst, captured particles being burned by heat of oxidation reaction which the fuel added by the fuel addition device undergoes on the oxidation catalyst to thereby attain forced regeneration of the particulate filter, and
an exhaust emission control device including a controller that includes a deposition amount estimating unit that estimates a particle deposition amount in the particulate filter, said controller automatically conducts fuel addition by the fuel addition device depending upon the deposition amount under a condition of the particulate deposition amount being estimated by said deposition amount estimating unit to be within an automatic regeneration range and an operation device voluntarily adds fuel by a driver's manual operation under a condition of an engine being in an idling state, and said controller controls fuel addition to be automatically conducted by said fuel addition device when a predetermined time has passed during the engine being in the idling state and with no manual operation of said operation device under a condition of the particulate deposition amount being estimated by the deposition amount estimating unit to be within a manual regeneration range over said automatic regeneration range.

* * * * *